United States Patent
Scialpi et al.

(10) Patent No.: US 11,566,532 B2
(45) Date of Patent: Jan. 31, 2023

(54) TURBINE CLEARANCE CONTROL SYSTEM

(71) Applicant: GE Avio S.r.l., Rivalta di Turin (IT)

(72) Inventors: Agostino Scialpi, San Giorgio Ionico (IT); Daniele Coutandin, Avigliana (IT); Matteo Renato Usseglio, Turin (IT); Giuseppe Greco, Veglie (IT)

(73) Assignee: GE Avio S.r.l., Rivalta di Turin (IT)

( * ) Notice: Subject to any disclaimer, the term of this patent is extended or adjusted under 35 U.S.C. 154(b) by 0 days.

(21) Appl. No.: 17/471,373

(22) Filed: Sep. 10, 2021

(65) Prior Publication Data

US 2022/0178267 A1   Jun. 9, 2022

(30) Foreign Application Priority Data

Dec. 4, 2020 (IT) .................. 102020000030020

(51) Int. Cl.
| | | |
|---|---|---|
| *F01D 11/24* | (2006.01) | |
| *B33Y 80/00* | (2015.01) | |
| *F01D 11/18* | (2006.01) | |
| *F01D 25/14* | (2006.01) | |

(52) U.S. Cl.
CPC .............. *F01D 11/24* (2013.01); *B33Y 80/00* (2014.12); *F01D 11/18* (2013.01); *F01D 25/14* (2013.01); *F05D 2240/14* (2013.01); *F05D 2270/303* (2013.01); *F05D 2270/44* (2013.01)

(58) Field of Classification Search
None
See application file for complete search history.

(56) References Cited

U.S. PATENT DOCUMENTS

| | | | | |
|---|---|---|---|---|
| 4,534,698 | A | | 8/1985 | Tomich |
| 4,610,135 | A | * | 9/1986 | Alexander ................ F23R 3/10 60/737 |
| 4,718,818 | A | | 1/1988 | Premont |
| 4,719,748 | A | * | 1/1988 | Davis, Jr ................ F23R 3/002 60/758 |
| 7,959,405 | B2 | | 6/2011 | Launders |
| 9,598,978 | B2 | | 3/2017 | Hoyland et al. |
| 9,816,510 | B2 | | 11/2017 | Harper |
| 2002/0005038 | A1 | * | 1/2002 | Boeck ..................... F01D 25/14 60/266 |
| 2003/0233834 | A1 | * | 12/2003 | Boeck ....................... F02C 7/18 60/805 |
| 2012/0114459 | A1 | * | 5/2012 | Benkler .................. F01D 5/088 415/115 |
| 2012/0325354 | A1 | * | 12/2012 | Janetzke ................. F01D 5/186 137/808 |
| 2013/0017060 | A1 | * | 1/2013 | Boswell .................. F01D 25/14 415/173.2 |

(Continued)

FOREIGN PATENT DOCUMENTS

| | | |
|---|---|---|
| EP | 1176285 A2 | 1/2002 |
| EP | 2372105 A2 | 10/2011 |
| EP | 3196423 A1 | 7/2017 |

*Primary Examiner* — Michael Lebentritt
(74) *Attorney, Agent, or Firm* — McGarry Bair PC (57) ABSTRACT

A turbine clearance control system is provided. The turbine clearance control system includes a cooling air source and a turbine casing surrounding a portion of a turbine, wherein the turbine casing defines an integral cooling duct within the turbine casing, the integral cooling duct including apertures on an interior surface of the turbine casing.

18 Claims, 4 Drawing Sheets

(56) References Cited

U.S. PATENT DOCUMENTS

| | | | |
|---|---|---|---|
| 2014/0144155 A1* | 5/2014 | Down | F01D 11/08 60/782 |
| 2014/0219814 A1* | 8/2014 | Heselhaus | F01D 5/186 416/96 R |
| 2014/0234073 A1* | 8/2014 | Moreton | F01D 25/14 415/1 |
| 2014/0341731 A1* | 11/2014 | Scott | F01D 11/003 29/889.22 |
| 2015/0218963 A1* | 8/2015 | Alecu | F01D 25/14 415/144 |
| 2015/0330406 A1* | 11/2015 | Kirchner | F01D 25/265 415/208.4 |
| 2015/0361809 A1* | 12/2015 | Soundiramourty | F01D 9/065 60/806 |
| 2016/0305281 A1* | 10/2016 | Ballard, Jr. | F02C 3/04 |
| 2017/0167273 A1* | 6/2017 | Maguire | F01D 5/187 |
| 2017/0314416 A1* | 11/2017 | Sharma | F01D 21/045 |
| 2017/0321564 A1* | 11/2017 | Bunker | F01D 5/187 |
| 2018/0066675 A1 | 3/2018 | Kappes et al. | |
| 2018/0283204 A1 | 10/2018 | Fracchia et al. | |
| 2018/0283205 A1 | 10/2018 | Fracchia et al. | |
| 2019/0063460 A1 | 2/2019 | Costa | |
| 2020/0123929 A1* | 4/2020 | Kazakos | F01D 9/06 |
| 2020/0325828 A1* | 10/2020 | De Carn-Carnavalet | F02C 6/08 |

\* cited by examiner

TURBINE CLEARANCE CONTROL SYSTEM

CROSS-REFERENCE TO RELATED APPLICATIONS

This application claims priority to Italian Patent Application Serial No. 102020000030020, filed Dec. 4, 2020, the contents of which are incorporated herein by reference.

TECHNICAL FIELD

The present subject matter relates generally to a gas turbine engine, or more particularly to a method and system for controlling clearance using integral cooling of a turbine casing.

BACKGROUND

Gas turbine engines include several sections that include rotating blades contained within engine housings such as a turbine casing. If a rotating blade breaks it must be contained within the engine housing. To ensure broken blades do not puncture the housing, the walls of the housing have been manufactured to be relatively thick and/or reinforced with fiber fabric. Turbine casings rely on external piping systems to cool the casing, such as an active clearance control (ACC) external pipe arrangement to supply cooler air to outer surfaces of the engine case to help maintain proper temperature of the engine casing and provide proper turbine rotor/stator clearance during operation. The complexity of the external piping and ancillary piping tubes, brackets and valve, increases manufacturing costs and increases the engine's weight.

BRIEF DESCRIPTION

Aspects and advantages of the invention will be set forth in part in the following description, or may be obvious from the description, or may be learned through practice of the invention.

In one exemplary embodiment of the present disclosure, a turbine clearance control system is provided. The turbine clearance control system includes a cooling air source; and a turbine casing surrounding a portion of a turbine, wherein the turbine casing defines an integral cooling duct within the turbine casing, the integral cooling duct including apertures on an interior surface of the turbine casing.

In certain exemplary embodiments a first portion of the apertures are positioned adjacent to a first region where the turbine casing and a turbine shroud are connected.

In certain exemplary embodiments a first flow of cooling fluid from the cooling air source is directed through the integral cooling duct within the turbine casing and through the first portion of the apertures directly to the first region where the turbine casing and the turbine shroud are connected.

In certain exemplary embodiments a second portion of the apertures are positioned adjacent to a second region where the turbine casing and a turbine vane are connected.

In certain exemplary embodiments a second flow of cooling fluid from the cooling air source is directed through the integral cooling duct within the turbine casing and through the second portion of the apertures directly to the second region where the turbine casing and the turbine vane are connected.

In certain exemplary embodiments a third flow of cooling fluid from the cooling air source is directed through the integral cooling duct within the turbine casing to cool a third region that is between the first region where the turbine casing and the turbine shroud are connected and the second region where the turbine casing and the turbine vane are connected.

In certain exemplary embodiments the turbine casing further includes warm flow expulsion apertures on an exterior surface.

In certain exemplary embodiments the turbine casing defines a first integral cooling duct within the turbine casing and a second integral cooling duct within the turbine casing, the second integral cooling duct spaced from the first integral cooling duct.

In certain exemplary embodiments the first integral cooling duct includes the first portion of the apertures positioned adjacent to the first region where the turbine casing and the turbine shroud are connected and the second portion of the apertures positioned adjacent to the second region where the turbine casing and the turbine vane are connected.

In certain exemplary embodiments the second integral cooling duct includes the first portion of the apertures positioned adjacent to the first region where the turbine casing and the turbine shroud are connected and the second portion of the apertures positioned adjacent to the second region where the turbine casing and the turbine vane are connected.

In certain exemplary embodiments the turbine casing is formed by an additive manufacturing process.

In an exemplary embodiment of the present disclosure, a method is provided for controlling a clearance between turbine rotors and stators. The method includes providing a turbine casing defining an integral cooling duct within the turbine casing, the integral cooling duct including apertures on an interior surface of the turbine casing; channeling a flow of cooling fluid through the integral cooling duct; and directing the flow of cooling fluid through the apertures.

In certain exemplary embodiments a first flow of cooling fluid is directed through a first portion of the apertures directly to a first region where the turbine casing and a turbine shroud are connected.

In certain exemplary embodiments a second flow of cooling fluid is directed through a second portion of the apertures directly to a second region where the turbine casing and a turbine vane are connected.

In certain exemplary embodiments a third flow of cooling fluid is directed through the integral cooling duct within the turbine casing to cool a third region that is between the first region where the turbine casing and the turbine shroud are connected and the second region where the turbine casing and the turbine vane are connected.

In certain exemplary embodiments the method includes directing the flow of cooling fluid from the apertures and through warm flow expulsion apertures on an exterior surface of the turbine casing.

In certain exemplary embodiments the turbine casing defines a first integral cooling duct within the turbine casing and a second integral cooling duct within the turbine casing, the second integral cooling duct spaced from the first integral cooling duct.

In certain exemplary embodiments the first integral cooling duct includes the first portion of the apertures and the second portion of the apertures and the second integral cooling duct includes the first portion of the apertures and the second portion of the apertures.

In certain exemplary embodiments the turbine casing is formed by an additive manufacturing process.

These and other features, embodiments and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A turbine clearance control system includes a turbine casing of the present disclosure that defines an integral cooling duct within the turbine casing. The integral cooling duct includes apertures on an interior surface of the turbine casing. The turbine casing has warm flow expulsion apertures on its exterior surface. The turbine casing of the present disclosure surrounds a portion of a turbine of a gas turbine engine.

A turbine casing having integral cooling ducts of the present disclosure provides direct impingement to regions where the turbine casing and the turbine are connected. In this manner, the turbine casing of the present disclosure by providing direct impingement enables (1) high cooling effectiveness with max temperature reduction, (2) higher clearance control capabilities, and (3) thermal gradient and thermal stress reductions. Temperature and stress reduction can lead to less expensive material and facilitate use of additive on structural high temperature components.

Figure 1:
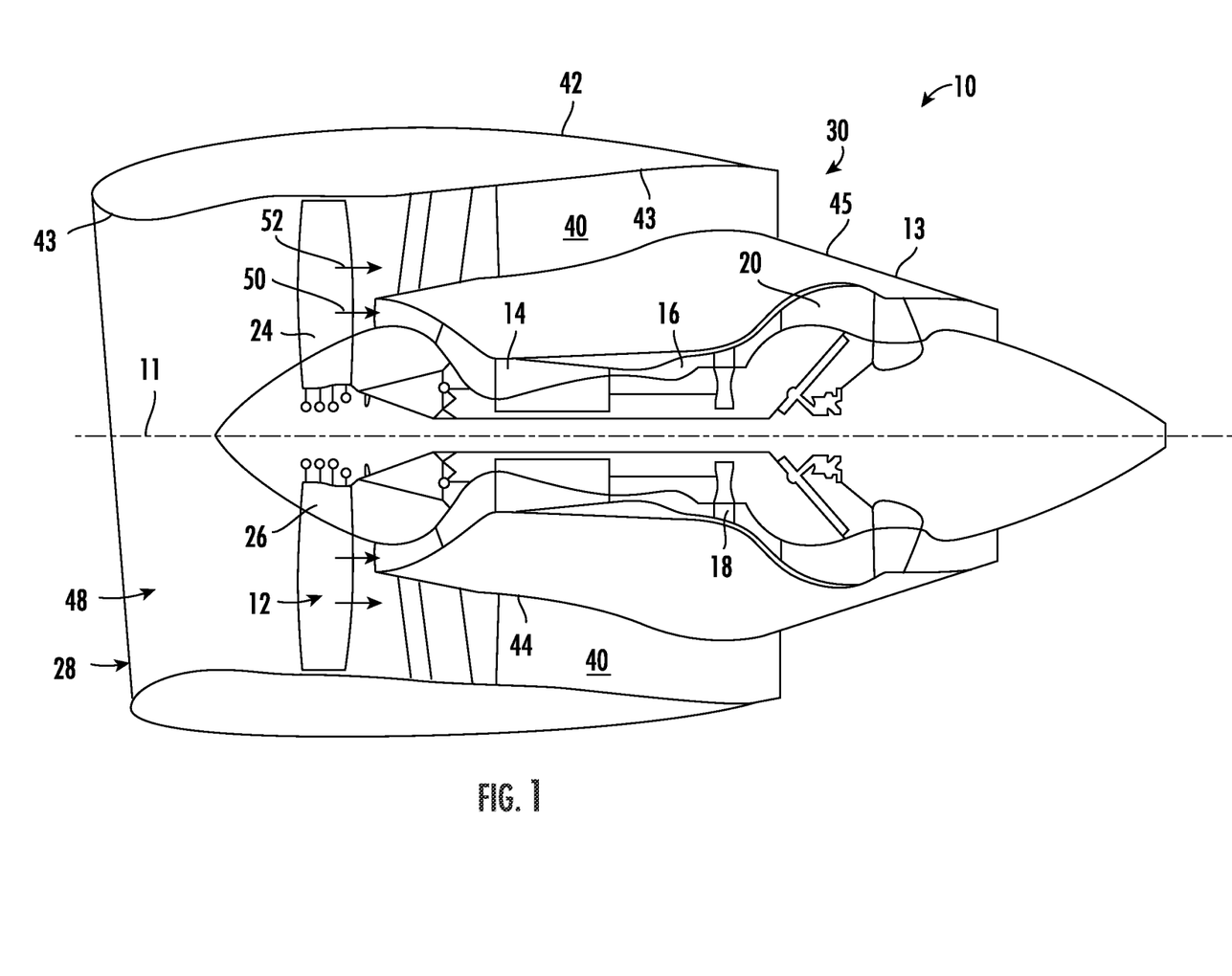
FIG. 1 is a schematic, cross-sectional view of an exemplary gas turbine engine in accordance with exemplary embodiments of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the exemplary gas turbine engine 10 has a longitudinal axis 11. Gas turbine engine 10 includes a fan assembly 12, and a core gas turbine engine 13. Core gas turbine engine 13 includes a high pressure compressor 14, a combustor 16, and a high pressure turbine 18. In the exemplary embodiment, gas turbine engine 10 may also include a low pressure turbine 20. Fan assembly 12 includes an array of fan blades 24 extending radially outward from a rotor disk 26. The gas turbine engine 10 has an intake side 28 and an exhaust side 30. Gas turbine engine 10 also includes a plurality of bearing assemblies (not shown) that are utilized to provide rotational and axial support to fan assembly 12, compressor 14, high pressure turbine 18 and low pressure turbine 20, for example.

In operation, an inlet airflow 48 flows through fan assembly 12 and is split by an airflow splitter 44 into a first portion 50 and a second portion 52. First portion 50 of the airflow is channeled through compressor 14 wherein the airflow is further compressed and delivered to combustor 16. Hot products of combustion from combustor 16 are utilized to drive turbines 18 and 20 and thus produce engine thrust. Gas turbine engine 10 also includes a bypass duct 40 that is utilized to bypass a second portion 52 of the airflow discharged from the fan assembly 12 around core gas turbine engine 13. More specifically, bypass duct 40 extends between an inner wall 43 of a fan casing or shroud 42 and an outer wall 45 of splitter 44.

Figure 2:
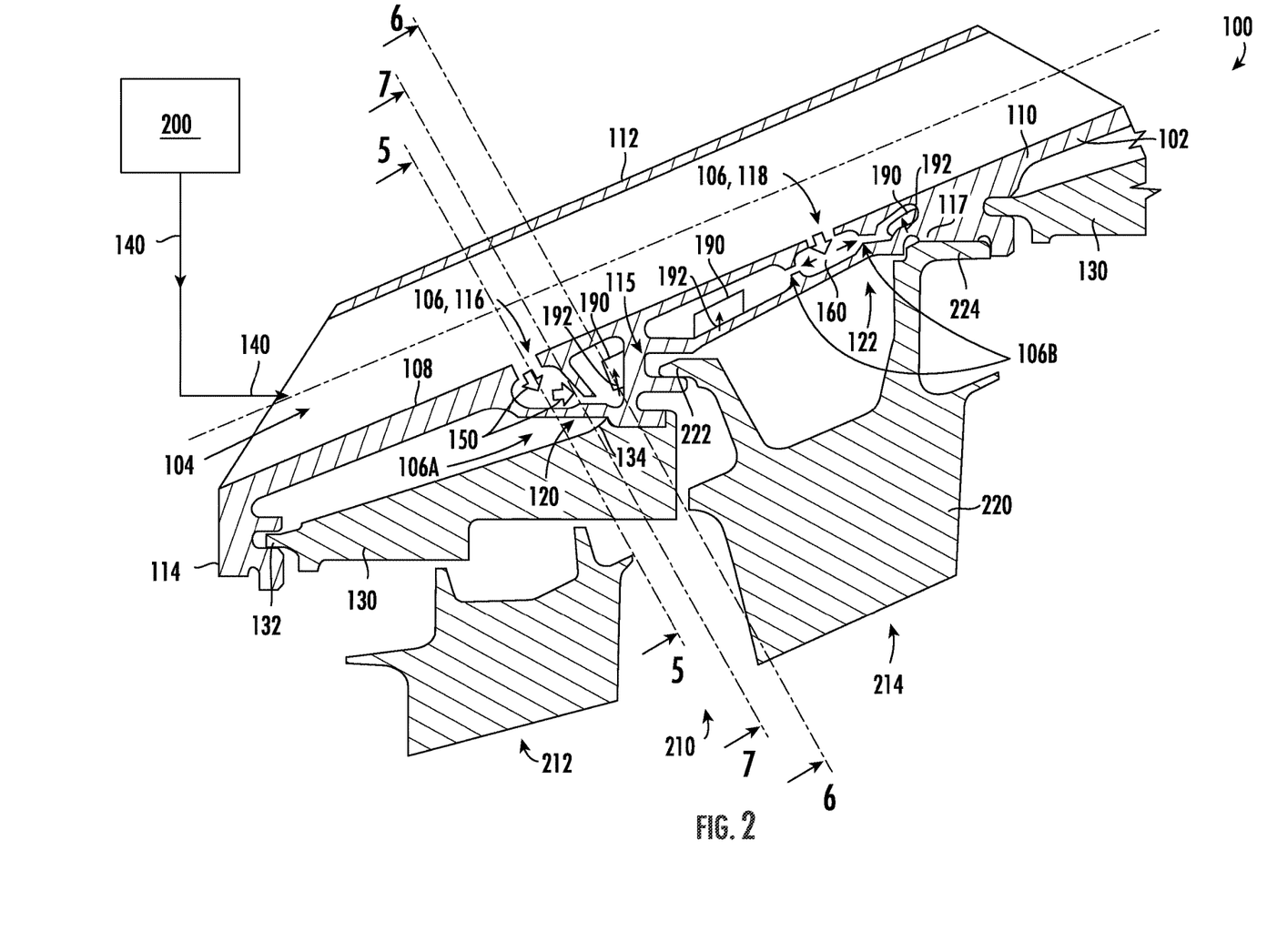
FIG. 2 is a cross-sectional view of a turbine clearance control system of a gas turbine engine in accordance with an exemplary embodiment of the present disclosure.

FIGS. 2-7 illustrate exemplary embodiments of the present disclosure. Referring to FIGS. 2-7, in an exemplary embodiment, a turbine clearance control system 100 includes a turbine casing 102 of the present disclosure that defines an integral cooling duct 104 within the turbine casing 102. The integral cooling duct 104 includes impingement apertures 106 on an interior surface 108 of the turbine casing 102. Referring to FIG. 2, in one exemplary embodiment, the turbine casing 102 surrounds a portion of a turbine 210 that includes a shroud 130, a blade assembly 212, and a nozzle or vane assembly 214. A turbine casing 102 of the present disclosure may be incorporated into a turbine 18, 20 of the gas turbine engine 10 shown in FIG. 1.

Referring to FIG. 2, in an exemplary embodiment, the turbine clearance control system 100 includes a cooling air source 200 that provides flows of cooling fluid to the integral cooling ducts 104 of the turbine casing 102. In one exemplary embodiment, the cooling air source 200 from which a flow of cooling air 140 is extracted and channeled along an integral cooling duct 104 within the turbine casing 102. In some embodiments, the cooling air source 200 is bypass air 52 from the bypass duct 40 of the gas turbine engine 10 (FIG. 1). In other embodiments, the cooling air source 200 is inlet airflow 48 from the fan assembly 12 of the gas turbine engine 10 (FIG. 1). In other embodiments, the cooling air source 200 is inlet airflow 48 from the fan assembly 12 of the gas turbine engine 10 (FIG. 1). In other embodiments, the cooling air source 200 is air from the high pressure compressor 14. Generally, the cooling air source 200 is any air source from outside core 13 that provides low temperature, low or high pressure air to turbine clearance control system 100. The use of such air in turbine clearance control system 100 minimizes the effect of removing a portion of the air from other gas turbine engine 10 systems and therefore minimizes the effect on the gas turbine engine 10 performance. It is contemplated that cooling air source 200 may also come from other systems of the gas turbine engine 10.

A turbine casing 102 having integral cooling ducts 104 of the present disclosure provides direct impingement to regions where the turbine casing 102 and the turbine 210 are connected. In this manner, the turbine casing 102 of the present disclosure by providing direct impingement enables (1) high cooling effectiveness with max temperature reduction, (2) higher clearance control capabilities, and (3) thermal gradient and thermal stress reductions. Temperature and stress reduction can lead to less expensive material and facilitate use of additive on structural hot component.

The cooling ducts 104 are integral to the turbine casing 102. As used herein, the term "integral" with respect to the cooling ducts 104 to the turbine casing 102 refers to the cooling ducts 104 each being contained within a single housing or casing of the turbine casing 102. In other words, each of the cooling ducts 104 are contained within a single turbine casing 102. In this manner, the cooling ducts 104 within the turbine casing 102 are distinguishable from piping external to a turbine casing. A turbine casing 102 of the present disclosure integrates such external piping inside the turbine casing 102 providing active clearance control and casing into a single component. Cooling fluids are then directly impinged to the hottest parts of the rails and/or connection regions between the turbine casing and components of the turbine. This increases the effectiveness of the clearance control and cooling features. A turbine casing 102 of the present disclosure allows for lower temperatures to be reached with the same amount of cooling fluid provided resulting in a positive impact on engine performances and a reduction in thermal gradients and stresses.

Figure 5:
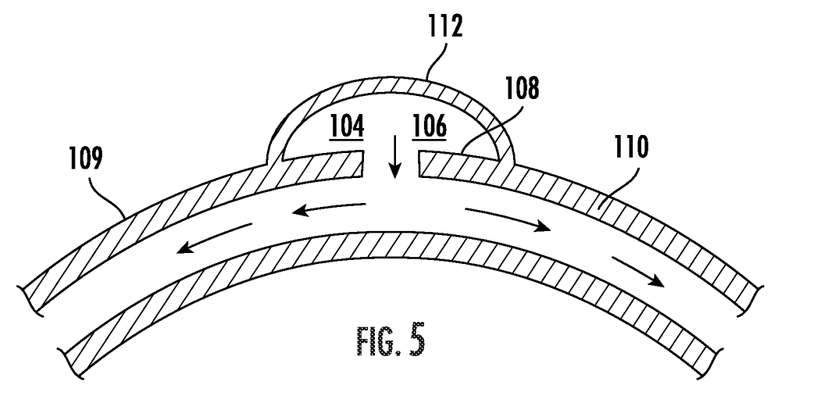
FIG. 5 is a cross-sectional view of a turbine clearance control system of a gas turbine engine taken along line 5-5 of FIG. 2 in accordance with an exemplary embodiment of the present disclosure.
Figure 6:
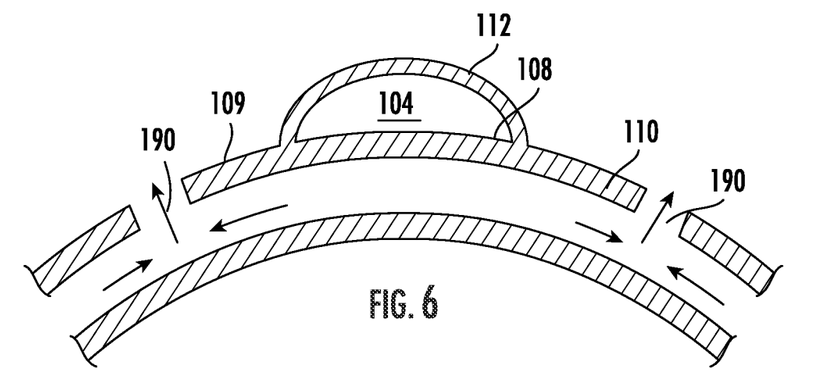
FIG. 6 is a cross-sectional view of a turbine clearance control system of a gas turbine engine taken along line 6-6 of FIG. 2 in accordance with an exemplary embodiment of the present disclosure.
Figure 7:
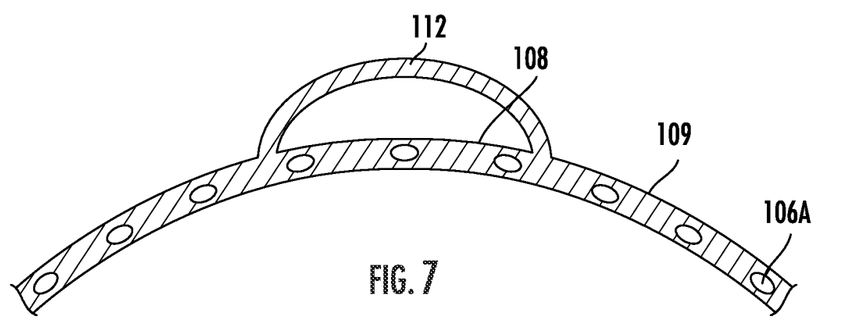
FIG. 7 is a cross-sectional view of a turbine clearance control system of a gas turbine engine taken along line 7-7 of FIG. 2 in accordance with an exemplary embodiment of the present disclosure.

FIG. 2 shows a cross section of a portion of a turbine casing 102 defining an integral cooling duct 104 within the turbine casing 102. FIGS. 5-7 shown in exemplary embodiments, the turbine casing includes a main wall 110, an outer wall 112, and an integral cooling duct 104 extending throughout the turbine casing 102. The integral cooling duct 104 is defined by the casing main wall 110 and by the outer wall 112. The integral cooling duct 104 includes impingement apertures 106 on an interior surface 108 of the turbine casing 102. Furthermore, the main wall 110 also includes warm flow expulsion apertures 190 on an exterior surface 109 of the turbine casing 102. In this manner, the turbine casing 102 of the present disclosure with integral cooling duct 104 allows for a complete external cooling flow path that is completely separated from the internal part of the turbine 210.

Figure 3:
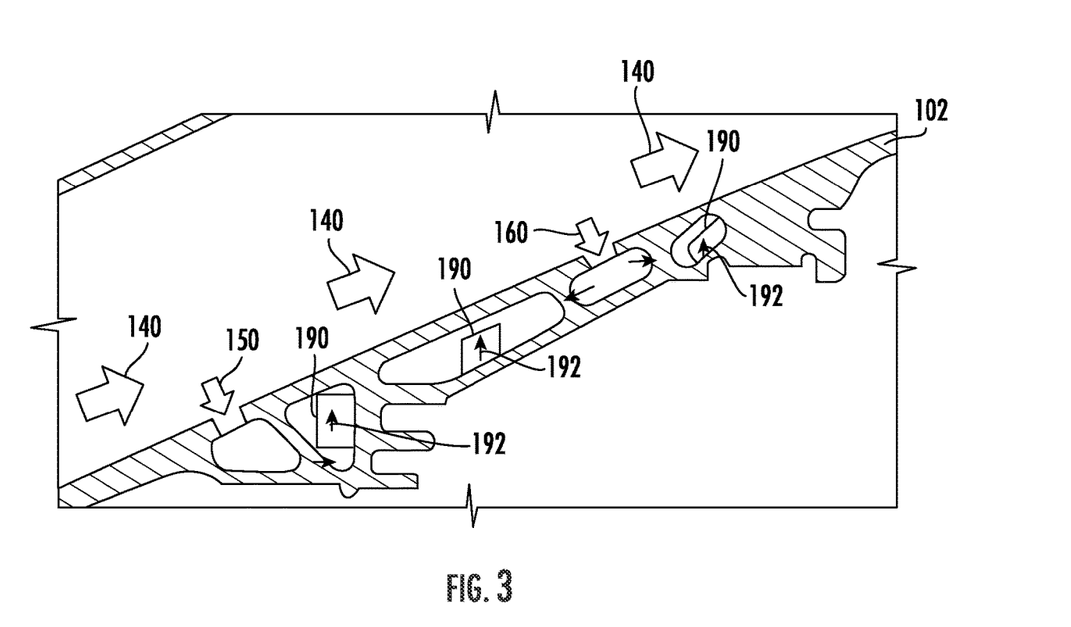
FIG. 3 is a cross-sectional view of a turbine clearance control system of a gas turbine engine in accordance with an exemplary embodiment of the present disclosure.

Referring to FIGS. 2, 3, and 5, in an exemplary embodiment, a first portion 116 of the impingement apertures 106 are positioned directly adjacent to a first region 120 where the turbine casing 102 and a turbine shroud 130 are connected.

In one exemplary embodiment, the turbine casing 102 includes a forward hook portion 114 that engages with a forward protrusion 132 of the shroud 130 and a rail portion 115 that engages a rear portion 134 of the shroud 130.

In this manner, the turbine casing 102 of the present disclosure allows for a first flow of cooling fluid 150 from the cooling air source 200 to be directed through the integral cooling duct 104 within the turbine casing 102 and through the first portion 116 of the impingement apertures 106 directly to the first region 120 where the turbine casing 102 and the turbine shroud 130 are connected. In the region 120 the cooling fluid 150 is directed through the impingement apertures 106A directly to the rail portion 115.

Referring to FIGS. 2 and 3, in an exemplary embodiment, a second portion 118 of the impingement apertures 106 are positioned directly adjacent to a second region 122 where the turbine casing 102 and a nozzle or turbine vane 220 are connected.

In one exemplary embodiment, the turbine casing 102 includes a rail portion 115 that engages with a forward protrusion 222 of the vane 220 and a connection portion 117 that engages a rear protrusion 224 of the vane 220.

In this manner, the turbine casing 102 of the present disclosure allows for a second flow of cooling fluid 160 from the cooling air source 200 to be directed through the integral cooling duct 104 within the turbine casing 102 and through the second portion 118 of the impingement apertures 106 directly to the second region 122 where the turbine casing 102 and the turbine vane 220 are connected. In the region 122 the cooling fluid 160 is directed through the impingement apertures 106B directly to the rail portion 115 and to the rail portion 117.

Advantageously, the turbine casing 102 having integral cooling ducts 104 of the present disclosure provides direct impingement to (1) the first region 120 where the turbine casing 102 and the turbine shroud 130 are connected and (2) the second region 122 where the turbine casing 102 and a nozzle or turbine vane 220 are connected. In this manner, the turbine casing 102 of the present disclosure by providing direct impingement enables (1) high cooling effectiveness with max temperature reduction, (2) higher clearance control capabilities, and (3) thermal gradient and thermal stress reductions. Temperature and stress reduction can lead to less expensive material and facilitate use of additive on structural hot component.

Furthermore, the turbine casing 102 of the present disclosure with an integral cooling duct 104 having impingement apertures 106 and with warm flow expulsion apertures 190 allows for a complete external cooling flow path that is completely separated from the internal part of the turbine 210. For example, after the flows of cooling fluid 150, 160 provide direct impingement to regions 120, 122, these flows of fluid which have now absorbed heat, e.g., flow of warmer air 192, are able to flow to and out of warm flow expulsion apertures 190.

Figure 4:
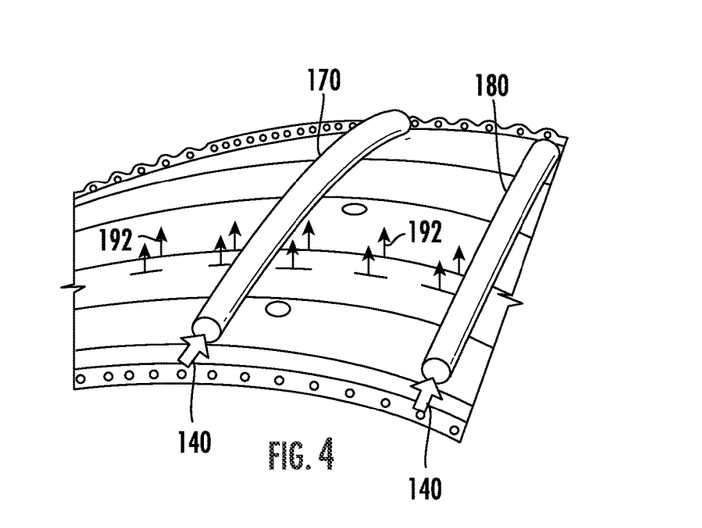
FIG. 4 is a perspective view of a turbine casing with integral cooling ducts in accordance with an exemplary embodiment of the present disclosure.

Referring to FIG. 4, in an exemplary embodiment, the turbine casing 102 of the present disclosure defines a first integral cooling duct 170 within the turbine casing 102 and a second integral cooling duct 180 within the turbine casing 102, the second integral cooling duct 180 spaced from the first integral cooling duct 170. It is contemplated that a turbine casing 102 of the present disclosure can have any number of spaced apart integral cooling ducts as desired for a particular application. In some embodiments, the first integral cooling duct 170 within the turbine casing 102 and the second integral cooling duct 180 within the turbine casing 102 may form cylindrical raised portions as shown in FIG. 4. In other embodiments, the integral cooling ducts may include other shapes and/or configurations.

In an exemplary embodiment, the first integral cooling duct 170 includes the first portion 116 of the impingement apertures 106 positioned adjacent to the first region 120 where the turbine casing 102 and the turbine shroud 130 are connected and the second portion 118 of the impingement apertures 106 positioned adjacent to the second region 122 where the turbine casing 102 and the turbine vane 220 are connected, as shown and described in detail with respect to FIG. 2.

In one exemplary embodiment, the second integral cooling duct 180 includes the first portion 116 of the impingement apertures 106 positioned adjacent to the first region 120 where the turbine casing 102 and the turbine shroud 130 are connected and the second portion 118 of the impingement apertures 106 positioned adjacent to the second region 122 where the turbine casing 102 and the turbine vane 220 are connected, as shown and described in detail with respect to FIG. 2.

In one exemplary embodiment, a turbine casing 102 of the present disclosure is formed using precision casting, advanced machining, or other traditional manufacturing machines or methods. In other exemplary embodiments, a turbine casing 102 of the present disclosure is formed using additive manufacturing machines or methods. As described in detail below, exemplary embodiments of the formation of a turbine casing 102 involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming a turbine casing 102 of the present disclosure using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single integral turbine casing 102 to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of a turbine casing 102 of the present disclosure. Accordingly, a three-dimensional design model of the component may be defined prior to manufacturing. In this regard, a model or prototype of the component may be scanned to determine the three-dimensional information of the component. As another example, a model of a turbine casing 102 of the present disclosure may be constructed using a suitable computer aided design (CAD) program to define the three-dimensional design model of the component.

The design model may include 3D numeric coordinates of the entire configuration of a turbine casing 102 of the present disclosure including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, a turbine casing 102 of the present disclosure described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of a turbine casing 102 of the present disclosure may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of a turbine casing 102 of the present disclosure is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form a turbine casing 102 of the present disclosure generally, additive manufacturing does provide a variety of manufacturing advantages, including ease of manufacturing, reduced cost, greater accuracy, etc.

Also, the additive manufacturing methods described above enable much more complex and intricate shapes and contours of a turbine casing 102 having integral cooling ducts 104 described herein to be formed with a very high level of precision. For example, such components may include thin additively manufactured layers, cross sectional features, and component contours. In addition, the additive manufacturing process enables the manufacture of a single integral turbine casing 102 having different materials such that different portions of the component may exhibit different performance characteristics. The successive, additive nature of the manufacturing process enables the construction of these novel features. As a result, a turbine casing 102 of the present disclosure formed using the methods described herein may exhibit improved performance and reliability.

In an exemplary aspect of the present disclosure, a method is provided for controlling a clearance between turbine rotors and stators. The method includes providing a turbine casing defining an integral cooling duct within the turbine casing, the integral cooling duct including impingement apertures on an interior surface of the turbine casing; channeling a flow of cooling fluid through the integral cooling duct; and directing the flow of cooling fluid through the impingement apertures and warm flow expulsion apertures on an exterior surface of the turbine casing.

Further aspects of the invention are provided by the subject matter of the following clauses:

1. A turbine clearance control system, comprising: a cooling air source; and a turbine casing surrounding a portion of a turbine, wherein the turbine casing defines an integral cooling duct within the turbine casing, the integral cooling duct including apertures on an interior surface of the turbine casing.

2. The turbine clearance control system of any preceding clause, wherein a first portion of the apertures are positioned adjacent to a first region where the turbine casing and a turbine shroud are connected.

3. The turbine clearance control system of any preceding clause, wherein a first flow of cooling fluid from the cooling air source is directed through the integral cooling duct within the turbine casing and through the first portion of the apertures directly to the first region where the turbine casing and the turbine shroud are connected.

4. The turbine clearance control system of any preceding clause, wherein a second portion of the apertures are positioned adjacent to a second region where the turbine casing and a turbine vane are connected.

5. The turbine clearance control system of any preceding clause, wherein a second flow of cooling fluid from the cooling air source is directed through the integral cooling duct within the turbine casing and through the second portion of the apertures directly to the second region where the turbine casing and the turbine vane are connected.

6. The turbine clearance control system of any preceding clause, wherein a third flow of cooling fluid from the cooling air source is directed through the integral cooling duct within the turbine casing to cool a third region that is between the first region where the turbine casing and the turbine shroud are connected and the second region where the turbine casing and the turbine vane are connected.

7. The turbine clearance control system of any preceding clause, wherein the turbine casing further includes warm flow expulsion apertures on an exterior surface of the turbine casing.

8. The turbine clearance control system of any preceding clause, wherein the turbine casing defines a first integral cooling duct within the turbine casing and a second integral cooling duct within the turbine casing, the second integral cooling duct spaced from the first integral cooling duct.

9. The turbine clearance control system of any preceding clause, wherein the first integral cooling duct includes the first portion of the apertures positioned adjacent to the first region where the turbine casing and the turbine shroud are connected and the second portion of the apertures positioned adjacent to the second region where the turbine casing and the turbine vane are connected; and wherein the second integral cooling duct includes the first portion of the apertures positioned adjacent to the first region where the turbine casing and the turbine shroud are connected and the second portion of the apertures positioned adjacent to the second region where the turbine casing and the turbine vane are connected.

10. The turbine clearance control system of any preceding clause, wherein the turbine casing is formed by an additive manufacturing process.

11. A method of controlling a clearance between turbine rotors and stators, the method comprising: providing a turbine casing defining an integral cooling duct within the turbine casing, the integral cooling duct including apertures on an interior surface of the turbine casing; channeling a flow of cooling fluid through the integral cooling duct; and directing the flow of cooling fluid through the apertures.

12. The method of any preceding clause, wherein a first flow of cooling fluid is directed through a first portion of the apertures directly to a first region where the turbine casing and a turbine shroud are connected.

13. The method of any preceding clause, wherein a second flow of cooling fluid is directed through a second portion of the apertures directly to a second region where the turbine casing and a turbine vane are connected.

14. The method of any preceding clause, wherein a third flow of cooling fluid is directed through the integral cooling duct within the turbine casing to cool a third region that is between the first region where the turbine casing and the turbine shroud are connected and the second region where the turbine casing and the turbine vane are connected.

15. The method of any preceding clause, further comprising: directing the flow of cooling fluid from the apertures and through warm flow expulsion apertures on an exterior surface of the turbine casing.

16. The method of any preceding clause, wherein the turbine casing defines a first integral cooling duct within the turbine casing and a second integral cooling duct within the turbine casing, the second integral cooling duct spaced from the first integral cooling duct; and wherein the first integral cooling duct includes the first portion of the impingement apertures and the second portion of the impingement apertures and the second integral cooling duct includes the first portion of the impingement apertures and the second portion of the impingement apertures.

17. The method of any preceding clause, wherein the turbine casing is formed by an additive manufacturing process.

18. The turbine clearance control system of any preceding clause, wherein the turbine casing defines any amount of spaced cooling ducts.

19. The turbine clearance control system of any preceding clause, wherein any integral cooling duct includes the first portion of the impingement apertures positioned adjacent to the first region where the turbine casing and the turbine shroud are connected and the second portion of the impingement apertures positioned adjacent to the second region where the turbine casing and the turbine vane are connected.

20. The turbine clearance control system of any preceding clause, wherein cooling fluid from the cooling air source is used also for a cooling of the casing in the third region between the first region where the turbine casing and the turbine shroud are connected and the second region where the turbine casing and the turbine vane are connected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbine clearance control system, comprising:
a cooling air source; and
a turbine casing surrounding a portion of a turbine, wherein the turbine casing defines an integral cooling duct within the turbine casing, the integral cooling duct including apertures on an interior surface of the turbine casing;
wherein a first portion of the apertures are positioned adjacent to a first region where the turbine casing and a turbine shroud are connected; and
wherein a second portion of the apertures are positioned adjacent to a second region where the turbine casing and a turbine vane are connected.

2. The turbine clearance control system of claim 1, wherein a second flow of cooling fluid from the cooling air source is directed through the integral cooling duct within the turbine casing and through the second portion of the apertures directly to the second region where the turbine casing and the turbine vane are connected.

3. The turbine clearance control system of claim 2, wherein a third flow of cooling fluid from the cooling air source is directed through the integral cooling duct within the turbine casing to cool a third region that is between the first region where the turbine casing and the turbine shroud are connected and the second region where the turbine casing and the turbine vane are connected.

4. The turbine clearance control system of claim 1, wherein the turbine casing further includes warm flow expulsion apertures on an exterior surface of the turbine casing.

5. The turbine clearance control system of claim 1, wherein the turbine casing defines a first integral cooling duct within the turbine casing and a second integral cooling duct within the turbine casing, the second integral cooling duct spaced from the first integral cooling duct.

6. The turbine clearance control system of claim 5, wherein the first integral cooling duct includes the first portion of the apertures positioned adjacent to the first region where the turbine casing and the turbine shroud are connected and the second portion of the apertures positioned adjacent to the second region where the turbine casing and the turbine vane are connected.

7. The turbine clearance control system of claim 6, wherein the second integral cooling duct includes the first portion of the apertures positioned adjacent to the first region where the turbine casing and the turbine shroud are connected and the second portion of the apertures positioned adjacent to the second region where the turbine casing and the turbine vane are connected.

8. The turbine clearance control system of claim 1, wherein the turbine casing is formed by an additive manufacturing process.

9. The turbine clearance control system of claim 1, wherein the turbine casing defines one or more spaced cooling ducts.

10. A method of controlling a clearance between turbine rotors and stators, the method comprising:
providing a turbine casing defining an integral cooling duct within the turbine casing, the integral cooling duct including apertures on an interior surface of the turbine casing;
channeling a flow of cooling fluid through the integral cooling duct;
directing the flow of cooling fluid through the apertures;
directing a first flow of cooling fluid through a first portion of the apertures directly to a first region where the turbine casing and a turbine shroud are connected; and
directing a second flow of cooling fluid through a second portion of the apertures directly to a second region where the turbine casing and a turbine vane are connected.

11. The method of claim 10, further comprising directing a third flow of cooling fluid through the integral cooling duct within the turbine casing to cool a third region that is between the first region where the turbine casing and the turbine shroud are connected and the second region where the turbine casing and the turbine vane are connected.

12. The method of claim 10, further comprising:
directing the flow of cooling fluid from the apertures and through warm flow expulsion apertures on an exterior surface of the turbine casing.

13. The method of claim 10, wherein the turbine casing defines a first integral cooling duct within the turbine casing and a second integral cooling duct within the turbine casing, the second integral cooling duct spaced from the first integral cooling duct.

14. A method of controlling a clearance between turbine rotors and stators, the method comprising:

providing a turbine casing defining an integral cooling duct within the turbine casing, the integral cooling duct including apertures on an interior surface of the turbine casing;

channeling a flow of cooling fluid through the integral cooling duct; and directing the flow of cooling fluid through the apertures;

wherein the turbine casing defines a first integral cooling duct within the turbine casing and a second integral cooling duct within the turbine casing, the second integral cooling duct spaced from the first integral cooling duct; and wherein the first integral cooling duct includes a first portion of the apertures and a second portion of the apertures and the second integral cooling duct includes the first portion of the apertures and the second portion of the apertures.

15. The method of claim 10, further comprising forming the turbine casing by an additive manufacturing process.

16. The method of claim 14, further comprising:
directing the flow of cooling fluid from the apertures and through warm flow expulsion apertures on an exterior surface of the turbine casing.

17. The method of claim 14, further comprising forming the turbine casing by an additive manufacturing process.

18. The turbine clearance control system of claim 1, wherein a first flow of cooling fluid from the cooling air source is directed through the integral cooling duct within the turbine casing and through the first portion of the apertures directly to the first region where the turbine casing and the turbine shroud are connected.

\* \* \* \* \*